United States Patent
Gresham

[11] 4,080,507
[45] Mar. 21, 1978

[54] FLUORINATED ETHER-ACRYLIC ESTERS AND POLYMERS THEREOF

[75] Inventor: John T. Gresham, Skillman, N.J.

[73] Assignee: FMC Corporation, Philadelphia, Pa.

[21] Appl. No.: 142,375

[22] Filed: May 11, 1971

Related U.S. Application Data

[63] Continuation-in-part of Ser. No. 778,748, Nov. 25, 1968, abandoned.

[51] Int. Cl.² .............................................. C07L 69/54
[52] U.S. Cl. .................................................... 560/223
[58] Field of Search ............................ 260/486 H, 486

[56] References Cited

U.S. PATENT DOCUMENTS

| | | | |
|---|---|---|---|
| 3,394,115 | 7/1968 | Sorkin | 260/486 H |
| 3,424,785 | 1/1969 | Pittman et al. | 260/486 H |

*Primary Examiner*—Paul J. Killos
*Attorney, Agent, or Firm*—Robert D. Jackson

[57] ABSTRACT

Fluorinated ether-acrylic esters of the formula

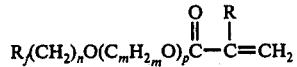

wherein R is hydrogen or methyl, $R_f$ is a perfluoroalkyl group of 4–16 carbon atoms, $n$ is 1–12, $m$ is 2–3 and $p$ is 1–4 are disclosed. Also disclosed are polymers of such esters for use in rendering textiles oil and water repellent.

9 Claims, No Drawings

FLUORINATED ETHER-ACRYLIC ESTERS AND POLYMERS THEREOF

CROSS REFERENCES TO RELATED APPLICATIONS

This is a continuation-in-part of Ser. No. 778,748, filed Nov. 25, 1968, now abandoned

BACKGROUND OF THE INVENTION

A. Field of the Invention

This invention relates to fluorinated acrylic esters. It is particularly concerned with fluorinated ether acrylic esters and polymers thereof useful in the treatment of textiles and other fibrous and porous materials for rendering them oil and water repellent.

B. Description of the Prior Art

The application of fiber-substantive materials to cloth for the purpose of increasing its water repellency, is well known in the modern textile field. Especially promising in this connection are certain organic fluorine derivatives which impart both water and oil repellency to textiles and other fibrous substrates. As a consequence, considerable work and effort is being channeled into the synthesis of organic fluorine compounds with a view to uncovering even more effective members of these entities.

SUMMARY OF THE INVENTION

I have now discovered that excellent oil and water repellent properties in articles can be realized by treating the articles with a polymer composition containing at least one novel polymer component formed from the polymerization of a fluorinated acrylic ester of the formula:

$$R_f(CH_2)_nO(C_mH_{2m}O)_p\overset{O}{\overset{\|}{C}}-\overset{R}{\overset{|}{C}}=CH_2$$

wherein R is hydrogen or methyl, $R_f$ is a perfluoroalkyl group of 4-16 carbon atoms, n is 1-12, m is 2-3 and p is 1-4, and the provision of these novel materials and their use as oil and water repellents constitutes the principal object and purpose of the invention. Other objects and purposes will become manifest subsequently.

DESCRIPTION OF THE INVENTION AND THE PREFERRED EMBODIMENTS

The acrylic esters of the invention are prepared by the usual esterification procedures. Thus, a fluorinated ether alcohol of novel structure can be reacted with an unsaturated carboxylic acid of the acrylic type. Other suitable ester syntheses include transesterification and reaction of an alcohol with an acid chloride. The preferred esters are derived from acrylic acid or methacrylic acid and an alcohol of the formula:

$$R_f(CH_2)_nO(CH_2CH_2O)_pH \quad (I)$$

wherein $R_f$, n and p have the significance as above defined.

Where the number of $CH_2$ units in the formula I are two or less, these compounds are obtained by reacting fluorinated lower alcohols of the formula:

$$R_f(CH_2)_{1-2}OH \quad (II)$$

wherein $R_f$ has the significance aforesaid, with the requisite number of moles of ethylene oxide, in the usual procedure of carrying out ethylene oxide/alcohol condensations. Generally, the ethylene oxide is introduced into the alcohol in the presence of a basic condensing agent as typified by sodium hydroxide. Elevated temperatures in the neighborhood of 100° C. are commonly employed. For a fuller description of the reaction of fluorinated lower alcohols with ethylene oxides, reference is made to U.S. Pat. No. 2,723,999, while the fluorinated lower alcohols (II) are described in U.S. Pat. No. 2,666,797 and 3,171,861.

Where the number of $CH_2$ units in formula I exceeds two, these compounds, although realizable by the method aforesaid, are more conveniently obtained utilizing generally known reactions wherein a perfluoroalkyl iodide is added to an ethylenically unsaturated ether alcohol, followed by reductive dehalogenation of the resulting iodo-ether-alcohol, in accordance with the following equations:

$$R_fI + CH_2=CH-(CH_2)_{n-2}-O(CH_2CH_2O)_pH \rightarrow R_f-CH_2CHI(CH_2)_{n-2}O-(CH_2CH_2O)_pH \quad (I)$$

$$R_fCH_2CHI(CH_2)_{n-2}-O(CH_2CH_2O)_pH \xrightarrow{\text{reductive}}_{\text{Dehalogenation}} \quad (2)$$
$$R_fCH_2CH_2-(CH_2)_{n-2}-O-(CH_2CH_2O)_pH$$

In practice, reaction (1) is carried out by heating essentially stoichiometric amounts of a perfluoroalkyl iodide with an ethylenically unsaturated ether alcohol under free-radical generating conditions. After the reaction is completed, the unreacted materials are removed by stripping and the residual product purified by distillation in vacuo. Compounds of the type formed by reaction 1 tend to be viscous liquids or low-melting solids.

Reaction (2) is effected by the reductive removal of iodine from the adduct of reaction (1) by catalytic hydrogenation in the presence of an acid acceptor. Satisfactory results are achieved by performing the reaction in the presence of a normally liquid, organic solvent, the normally liquid saturated lower aliphatic alcohols being particularly suitable. Ethyl alcohol is an excellent choice, since it is capable of dissolving the adducts.

The acid acceptor is preferably an alkali metal carbonate or alkaline earth metal carbonate, as exemplified by sodium carbonate, potassium carbonate, calcium carbonate, as well as other bases having about the same degree of alkalinity. Moreover the base should exhibit limited solubility in the reaction medium, since otherwise dehydrofluorination may occur, thereby leading to the formation of undesirable by-products. For instance, a strong base such as potassium hydroxide which is appreciably soluble in the reaction medium, should not be used since it promotes the dehydrofluorination.

The catalyst may be any of those commonly employed in reductive dehalogenation, and in this connection, typical examples include Raney nickel, palladium, platinum, etc.

The usual procedure is to place the base, starting material, catalyst, hydrogen, and solvent in a pressure vessel, followed by shaking or agitating to effect even distribution of the catalyst throughout the reaction medium. After the reduction is complete, the metal catalyst is removed and the resulting ether-alcohol purified, usually by fractional distillation.

The ethylenically unsaturated ether-alcohol intermediates used in the above described reaction are known chemical entities, which are described in the technical literature. They are commonly obtained by condensing a terminally unsaturated 1-alkenol with an alkylene oxide. The number of oxyalkylene units in the product is controlled by the number of moles of alkylene oxide used. One mole serves to introduce 1 unit, 2 moles — 2 units, etc.

The fluorinated acrylic esters herein are valuable monomers useful in preparing polymer compositions which impart excellent oil and water repellency to textiles and other substrates such as paper, leather, etc. In formulating the polymer compositions aforesaid, the polymer component may be a homopolymer derived solely from one or more of the fluorinated acrylic esters of the invention and having the recurring unit

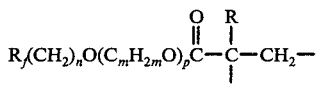

wherein $R_f$, $R$, $m$, $n$ and $p$ may be the same or different. Exemplary fluorinated acrylic ester monomers from which such homopolymers can be prepared include:

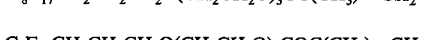

From the standpoint of economy and in some instances for the sake of achieving superior performance, the polymer compositions are preferably formulated wherein the polymer component is derived only in part from the fluorinated acrylic esters herein. Thus, the polymer can be a copolymer of one or more of the fluorinated acrylic esters herein with a non-fluorine containing vinyl compound. Or the polymer component can be a mixture of a non-fluorinated polymer or polymers and a homopolymer or copolymer formed from one or more of the fluorinated acrylic esters of the invention.

The homopolymers and copolymers aforesaid can be produced by methods known to the art, such as bulk polymerization, solution polymerization and emulsion polymerization, using catalysts such as benzoyl peroxide, or other free radical polymerization initiators. Solvents illustrative of those which can be used as media in the solution polymerization are trichlorofluoromethane; 1,2,2-trichloroethane; benzene; benzotrifluoride; xylene hexafluoride; 1,1-dichloroethane; the lower saturated aliphatic esters such as butyl acetate and the like.

Suitable co-monomrs include generally the ethylenically unsaturated monomers, including acrylates and methacrylates, vinyl esters of aliphatic acids, styrene and alkyl styrenes, vinyl halides, vinylidene halides, allyl esters, vinyl alkyl ketones, acrylamides, butadienes, and the like. Specific examples of the aforelisted general compounds are the methyl, ethyl, propyl, butyl, isoamyl, 2-ethylhexyl, octyl, octadecyl, undecyl, cetyl and N,N-diethylaminoethyl esters of acrylic acid and metacrylic acid; the vinyl esters of acetic, propionic, caprylic, lauric, and stearic acids; styrene, 2-methylstyrene, p-methylstyrene, vinyl fluoride, vinyl chloride and vinyl bromide, vinylidene chloride and vinylidene fluoride, allyl esters of heptanoic, caprylic, and caproic acids, vinyl ethyl ketone, vinyl methyl ketone, 1,3-butadiene, 2-chloro-1,3-butadiene, 2,3-dichloro-1,3-butadiene, N-methylol acrylamide and N-methylol methacrylamide, glycidyl acrylate and glycidyl methacrylate, and others. The specific reason for adding or using N-methylol acrylamide and/or methacrylamide in the co-polymerization reaction is that these compounds improve the durability of the resulting polymer, after it becomes associated with the cellulosic fibers. Suitable catalysts for initiating polymerization whether co- or homopolymerization, include 2,2'-azodiisobutyramidine dihydrochloride, 2,2'-azodiisobutyronitrile, 4,4'-azobis(4-cyanovaleric acid), sodium peroxide, barium peroxide, hydrogen peroxide, ammonium persulfate, potassium persulfate, as well as various organic peroxides. The concentration of the initiator is commonly between about 0.1 and about 2% of the weight of the monomers. Generally the polymerization is carried out by raising the temperature to about 40° C. to 70° C.

Typical of the substrates which are amenable to treatment with the compositions produced according to the present invention are films, fibers, yarns, fabrics, and articles made from filaments, fibers, or yarns derived from natural, modified natural, or synthetic polymeric materials or from blends of these. Specific examples are cotton, silk, regenerated cellulose, nylon, fiber-forming linear polyesters, fiber-forming polyacrylonitrile, cellulose nitrate, cellulose acetate, ethyl cellulose, paper, fiber glass and the like. Dyed and undyed cotton sateen, poplin, broadcloth, jean cloth, gabardine and the like are especially adaptable for treatment with the compositions of this invention to provide products having a high repellency to oil and water and being reltively unaffected by the action of heat, air and light. Materials rendered oil and water repellent retain a portion of the original repellent when laundered and dry cleaned.

The compositions herein are applied to the desired substrate preferably as an aqueous dispersion, by brushing, dipping, spraying, padding, roll-coating or by any combination of these methods. For example, the prepared concentrated dispersion of polymer composition may be used as a pad bath by diluting it with water or other suitable media to a solids content of 0.1 to 10% by weight of the bath. Thus, a sample of textile or paper is padded in an aqueous bath of the type aforesaid and then freed of excess liquid, usually by squeeze rolls to a dry pickup (weight of the dry polymer on the substrate) between about 0.1 and 10% by weight of the fiber. The treated material is then heated at 165° to 195° C. for at least about 15 seconds to impart maximum repellency and durability of the agent on the material.

The resulting material exhibits resistance to both water and oil and in the case of textile material such properties even after many launderings and dry cleanings. Liquids other than water also serve as dispersing media.

Other methods for applying the compositions include the use of solutions in place of dispersions and stepwise deposition of polymers. Application from solution is carried out generally in the same manner as application from dispersions. Stepwise application involves deposition of the polymers separately, usually the non-fluorinated polymer being applied first. Each polymer may be applied either as a dispersion or solution by any of the means described, and the curing step may be used after both steps if desired. The cure after the second application is necessary.

The following examples illustrate the present invention and the practice thereof.

Preparation of the Intermediate Ether-Alcohols

EXAMPLE 1

$C_8F_{17}CH_2CH_2CH_2OCH_2CH_2OH$

The following reagents are placed in a one gallon stirred autoclave: 2(2'-iodo-4,4,5,5,6,6,7,7,8,8,9,9,10,10,11,11,11-heptadecafluoroundecyloxy)ethanol (292 g.; 0.45 moles), potassium carbonate (69 g., 0.5 moles), 5% palladium on charcoal (30 g.), and absolute ethanol, (1,000 ml.). The autoclave is filled with hydrogen to a pressure of 800 psi, and heated to 60° C. After stirring for 21 hours, the reaction is stopped. The catalyst is removed by filtration, the solvent evaporated under reduced pressure and the residue taken up in ether. The ether solution is washed with water and dried over magnesium sulfate. After filtering off the drying agent, the solvent is evaporated, leaving 217 g. (0.415 moles) of dark yellow liquid having $n_D^{25}$ 1.3435. The material is distilled on a spinning band column giving 171 g., 0.33 moles, (73%) of purified material boiling at 134° C. at 8.4 mm pressure.

The intermediate 2(2'-iodo-4,4,5,5,6,6,7,7,8,8,9,9,10,10,11,11,11,-heptadecafluoroundecyloxy)ethanol aforesaid is obtained as follows:

Perfluorooctyl iodide (224 g., 0.41 moles), washed free of iodine with sodium bisulfite, is placed in a three-necked flask equipped with a thermometer, inlet, condenser, stopper and bubbler. Freshly distilled allyloxyethanol (43 g., 0.42 moles) and ABN [azobis(isobutyronitrile)] (0.7 g., 0.004 moles) are then added. The flask and contents are heated to 85° C., at which point the mixture is clear and water-white. At 90° C. the reaction becomes exothermic. At 105° C. the evolution of heat becomes extremely rapid and the temperature rises quickly to about 140° C. Stirring is continued and the reaction allowed to cool to 95° C. Heating is resumed and the reaction maintained at this temperature for 2 hours. Addition of 0.34 g. (0.002 moles) of ABN at this point does not produce an exotherm. Heating is resumed for 2 hours and a like amount of ABN added. After 4 more hours, the reaction is stopped and allowed to stand overnight and then stripped. There is removed 81 g. of unreacted starting materials leaving 184 g. (70%) of product which solidified on cooling.

The recovered starting materials can be reacted to give an additional 48 g. of product for a total yield of 232 g. (88%).

EXAMPLE 2

$C_7F_{15}CH_2CH_2CH_2OCH_2CH_2OH$

The following reagents are placed in a Parr shaker: 2(2'-iodo-4,4,5,5,6,6,7,7,8,8,9,9,10,10,10-pentadecafluorodecyloxy) ethanol (14.9 g., 0.025 moles), potassium carbonate (3.8 g., 0.028 moles), absolute alcohol (75 ml.) and 5% palladium on charcoal (2.9 g.). The mixture is hydrogenated for 18 hours, during which time the pressure drops by two pounds. The shaker is stopped and the material worked up as described in the preceding example.

The intermediate 2(2'-iodo-4,4,5,5,6,6,7,7,8,8,9,9,10,10,10-pentadecafluorodecycloxy)ethanol was prepared from perfluoroheptyl iodide and allyloxyethanol according to the method given in Example 1.

EXAMPLE 3

$C_8F_{17}(CH_2)_3O(CH_2CH_2O)_2H$

A mixture of 992 g. (1.43 mole) of 2-(2'-iodoheptadecafluoroundecyloxyethoxy)ethanol, 226 g. (1.65 moles) of potassium carbonate, 100 g. of 5% palladium on charcoal, and 1000 ml. of 2-propanol is reduced in a stirred autoclave at 50° C. and at a pressure of 800 psi hydrogen for 21 hours. After filtration and removal of the solvent, 741 g. (91%) of crude product is obtained which is distilled on a 36 inch spinning band column collecting a major fraction of 620 g. at 122°–125° (1.0 mm), $n_D^{25}$ 1.3550.

The intermediate 2-(2'-iodoheptadecafluoroundecyloxyethoxy)ethanol is prepared by the reaction of allyloxyethoxyethanol and a mixture of 5% $C_6F_{13}I$; 85% $C_8F_{17}I$ and 10% $C_{10}F_{21}I$ using the procedure of Example 1.

EXAMPLE 4

$C_8F_{17}(CH_2)_3OCH(CH_3)CH_2OH$

A mixture of 61.5 g. of n-$C_8F_{17}CH_2CHICH_2OCH(CH_3)CH_2OH$, 6.1 g. 5% palladium on charcoal, 225 ml. of absolute ethanol and 13.8 g. of powdered, anhydrous potassium carbonate is hydrogenated at 50 psi on a Parr shaker. The solids are removed by filtration and the filtrate evaporated. The residue is dissolved in methylene chloride. The organic solution is washed with water, dried and stripped at reduced pressure to isolate the product. The reaction is repeated. The combined products amount to 88.9 g. Distillation gives six fractions as follows:

| Fraction | Boiling Point (° C) | Pressure (mm Hg) | Weight (g) |
|---|---|---|---|
| 1 | 120–125 | 7.5 | 0.7 |
| 2 | 125–130 | 7.5 | 7.2 |
| 3 | 130–132 | 7.5 | 16.1 |
| 4 | 132–134 | 7.5 | 35.4 |
| 5 | 134 | 7.5 | 20.2 |
| 6 | 134–121 | 7.5–5 | 4.6 |

Analysis by gas chromatography shows: Fraction 3 contains 8.7% of the $C_6F_{13}$-alcohol, 82.6% $C_8F_{17}$- alcohol and 1.4% $C_{10}F_{21}$-alcohol. Fraction 4 contains 1.9% of the $C_6F_{13}$-alcohol, 90.1% $C_8F_{17}$-alcohol and 2.4% $C_{10}F_{21}$-alcohol. Fraction 5 contains 1.5% $C_6F_{13}$-alcohol, 87.1% $C_8F_{17}$-alcohol and 7.2% $C_{10}F_{21}$-alcohol. Other related alcohols are present in these fractions.

The intermediate $C_8F_{17}CH_2CHICH_2OCH(CH_3)CH_2OH$ is obtained as follows: One hundred eleven grams of a mixture of about 5% $C_6F_{13}I$, 85% $C_8F_{17}I$ and 10% $C_{10}F_{21}I$, 23.2 g. of 2-allyloxy-1-propanol (D. Swern et al, J. Am. Chem. Soc., 71, 1152 (1949)) and 0.3 g. of azobisisobutryonitrile (ABN) are heated under nitrogen at 70° for 4 hr. An additional 0.15 g. of catalyst is added and the mixture heated overnight. The unreacted materials (47 g.) are removed by distillation at reduced pressure leaving 86.3 g. of adduct. The unreacted materials are re-reacted with 0.11 g. of catalyst and yielded 36.6 g. of additional adduct, total 122.9 g. Anal. %I Calcd 19.2. Found: 20.5.

Preparation of Acrylic Esters

EXAMPLE 5

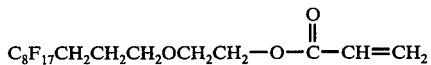

The following are placed in a 500 ml. three-neck flask: benzene (150 g.), heptadecafluoroundecyloxyethyl alcohol (prepared according to Example 1) (104 g., 0.2 moles), acrylic acid (18 g., 0.25 moles), p-toluenesulfonic acid (1.5 g.) and phenothiazone (1.0 g.). The flask is equipped with a short Vigreux column wrapped with heating tape and a Dean Stark trap with condenser. The mixture is heated to 84° C. and stirred for 6 hours while collecting the water of reaction. An additional 6 g. (0.08 moles) of acrylic acid is added and the mixture heated for two more hours. Benzene is distilled off until the temperature reaches about 93° C. and the remainder of the solvent removed on a flash evaporator. The ester is dissolved in methylene chloride and the solution washed first with 10% sodium hydroxide, then with water, and dried over magnesium sulfate. The drying agent is filtered off, and the methylene chloride evaporated. The yield of crude material is 111 g. Distillation at 97°–100° C./0.3–0.4 mm gives 97.3 g. (0.17 moles, 85%) of purified product.

EXAMPLE 6

The following are placed in a 1-liter flask: Heptadecafluoroundecyloxyethanol (Example 1), containing about 10% of material in which $R_f=C_6F_{13}$ and $C_{10}F_{21}$(391 g., 0.75 moles), methyl methacrylate (300 g., 3.0 moles), phenothiazine (7.5 g.) and sulfuric acid (10 g.). The flask is equipped with a magnetic stirrer and a 30 cm. column packed with glass Raschig rings. The mixture is stirred and distilled slowly while keeping the still head temperature at 65° C. or lower. After about five hours this is generally no longer possible, and the still head temperature is allowed to rise slowly to 90° C. The reaction mixture is distilled at 70 mm. to remove exces methyl methacrylate and then at 0.3 mm. to give 391 g. (91%) of crude product. Redistillation gives 348 g. of ester boiling at 90°–92° C./0.2 mm. pressure and having $n_D^{25}$ 1.3565. Vapor phase chromatography shows the product to be 98% pure methacrylate.

EXAMPLE 7

The following are placed in a 250 ml. flask: Pentadecafluorodecyloxyethanol (See Example 2) (47.2 g., 0.1 mole), methyl methacrylate (40 g., 0.4 mole), phenothiazine (1 g.), and sulfuric acid (1.5 g.). The flask is equipped with a magnetic stirrer and a 25 cm. column packed with glass Raschig rings. The mixture is stirred and distilled slowly through the column until the still head temperature reaches 100° C. This generally requires about four hours. The excess methyl methacrylate is removed at water aspirator pressure and the residue distilled rapidly at vacuum pump pressure to give 36.5 g. (68%) of crude product. Redistillation at 0.2 mm. pressure gives 31.3 g. (58%) of purified material boiling at 96°–99° C. and having $n_D^{25}$ 1.3619.

EXAMPLE 8

A mixture of 83.5 g. $C_8F_{17}(CH_2)_3O(CH_2CH_2O)_2H$, 15 g. methacrylic acid, 1.8 g. methanesulfonic acid, 130 ml. of toluene, and 0.24 g. t-butylcatechol is heated for 4 hr. at reflux collecting the water of reaction. After removal of the toluene, methylene chloride is added and the solution washed with sodium bicarbonate solution and water. After drying and removal of the solvent, 88 g. of crude methacrylate ester is obtained which contains about 0.7% unreacted alcohol as determined by gas chromatographic analysis.

Distillation gives a main cut boiling at 100° C./0.02 mm., 66.6 g. This cut contains about 0.4% unreacted alcohol and is redistilled collecting 50.3 g., bp 99° C./0.01 mm. It contained less than 0.3% alcohol. Analysis by gas chromatography shows 5.2% $C_6F_{13}(CH_2)_3O(CH_2CH_2O)_2COC(CH_3)=CH_2$, 86.2% $C_8F_{17}(CH_2)_3O(CH_2CH_2O)_2-COC(CH_3)=CH_2$ and 5.3% $C_{10}F_{21}(CH_2)_3O(CH_2CH_2O)_2COC(CH_3)=CH_2$.

EXAMPLE 9

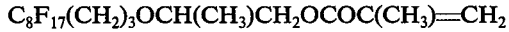

A mixture of 51 g. n-$C_8F_{17}(CH_2)_3OCH(CH_3)CH_2OH$ (fractions four and five of Example 4), 10 g. methacrylic acid, 85 ml. toluene, 1.2 g. methanesulfonic acid, and 0.16 g. t-butylcatechol are refluxed for 4½ hr. removing water as formed. The reaction mixture is stripped, taken up in methylene chloride, washed with sodium bicarbonate solution and water. After drying and removal of the solvent, 52 g. of crude product is obtained containing 1.8% unreacted alcohol by gas chromatographic analysis. Distillation of the methacrylate gives two major fractions: 5.5 g., bp 90°–19° C./0.15 mm. and 36.0 g., bp 91° C./0.15 mm. On analysis by gas chromatograhy the smaller fraction showed 5.2% unreacted alcohol and the larger 0.5% unreacted alcohol, 1.2% of the $C_6F_{13}(CH_2)_3OCH(CH_3)CH_2OCOC(CH_3)=CH_2$, 92.2% $C_8F_{17}(CH_2)_3OCH(CH_3)-CH_2OCOC(CH_3)=CH_2$ and 3.6% $C_{10}F_{21}(CH_2)_3OCH(CH_3)CH_2OCOC(CH_3)=CH_2$.

Polymer Preparation

EXAMPLE 10

Polymerization of $R_fCH_2CH_2CH_2OCH_2CH_2OCHOCH=CH_2$

A small screw-cap glass bottle is charged with 5.0 g. $R_fCH_2CH_2CH_2OCH_2CH_2OCOCH=CH_2$ ($R_f$ = 87% $C_8F_{17}$ and 13% $C_6F_{13}$ plus $C_{10}F_{21}$), 25 mg potassium persulfate, 250 mg stearyltrimethylammonium bromide, 6.75 g. deionized water and 2.25 g. acetone. The bottle is purged with nitrogen, sealed and tumbled in a constant temperature, water bath at 50° C. for over sixten hours. A nearly water white latex is obtained in 90.7% yield after filtration through cheesecloth.

EXAMPLE 11

Polymerization of $C_7F_{15}CH_2CH_2CH_2OCH_2CH_2OCC(CH_3)=CH_2$ (with carbonyl O)

In a 100 ml. three-necked round bottom flask equipped with a reflux condenser, thermometer, mechanical stirrer, and nitrogen inlet, is placed a 4,4'-azobis(4cyanovaleric acid), 0.2 g., dissolved in 5 g. of acetone. To this is added a solution of 1 g. of stearyltrimethylammonium bromide in 30 ml. of water previously boiled under nitrogen to remove oxygen. The mixture is stirred for five minutes without heat. Next a 10 g. sample of the methacrylate, prepared according to Example 7 is added. Stirring is resumed for 5 minutes, after which heating is begun and the temperature is raised to 65° C. The total reaction time is six hours. The solution at the end of this period weighs 42 g. and contains 20% solids. The conversion of monomer to polymer corresponds to about 76%.

EXAMPLE 12

Polymerization of $C_8F_{17}(CH_2)_3O(CH_2CH_2O)_2COC(CH_3)=CH_2$

A screw cap bottle is charged with 0.25 g. stearyltrimethylammonium bromide, 2.25 g. acetone, 6.75 g. deionized water, 5.0 g. of a mixture of 1% $C_6F_{13}(CH_2)_3O(CH_2CH_2O)_2COC(CH_3)=CH_2$, 84.3% $C_8F_{17}(CH_2)_3O(CH_2CH_2O)_2COC(CH_3)=CH_2$, and 7.5% $C_{10}F_{21}(CH_2)_3O(CH_2CH_2O)_2COC(CH_3)=CH_2$, and 25 mg. potassium persulfate. The bottle is purged with nitrogen, capped and placed in a water bath at 50° C. It was tumbled for about 16 hours and removed. After filtration through cheesecloth 13.6 g. of latex (35.2% solids) is obtained.

EXAMPLE 13

Polymerization of $C_8F_{17}(CH_2)_3OCH(CH_3)CH_2OCOC(CH_3)=CH_2$

A screw cap bottle is charged with 0.5 g. stearyltrimethylammonium bromide, 4.50 g. acetone, 13.5 g. deionized water, 7.5 g. $C_8F_{17}(CH_2)_3OCH(CH_3)CH_2OCOC(CH_3)=CH$ of Example 9, 2.5 g. isodecyl methacrylate, 42 mg. N-methylolacrylamide, 25 mg. 2-hydroxyethyl methacrylate, 50 mg. lauryl mercaptan, and 50 mg. of potassium persulfate. The bottle is purged with nitrogen, sealed, placed in a water bath at 50° C. and tumbled for 16 hr. A bluish-white latex (26.9 g., 35.6% solids) is obtained.

Utility of the Polymer Compositions

The polymer compositions of the invention are evaluated for their oil and water properties using the following test procedures:

Water Repellency

Resistance to wetting (spray test) AATCC (American Association of Textile Chemists and Colorists) — standard test method 22-1952.

This test is applicable to any textile fabric. It measures the resistance of fabrics to wetting by a water spray and the results depend primarily on the degree of hydrophobicity inherent in the fibers and yarns and subsequent treatments to which the fabric is subjected. Water is sprayed against the taut surface of a test specimen. Evaluation of the wetted pattern is readily brought about by comparing the wetted pattern with standard wetting pattern pictures:

| Rating | Characterized by |
|---|---|
| 100 | No sticking or wetting of the upper surface. |
| 90 | Slight random sticking or wetting of the upper surface. |
| 80 | Wetting of the upper surface at spray points. |
| 70 | Partial wetting of the whole of the upper surface. |
| 50 | Complete wetting of the whole of the upper surface. |
| 0 | Complete wetting of the whole of the upper and lower surfaces. |

The test specimens of minimum size of 7 inches × 7 inches (seven inches by seven inches) are conditioned at 70° F. and 65 percent relative humidity for a minimum of 4 hours before testing.

The test specimen, fastened securely and wrinkle-free in a metal hoop having a diameter of 6 inches, is placed and centered 6 inches under a standard spray nozzle at an angle of 45° to the horizontal. Two hundred and fifty milliliters of water at 80° ± 2° F. is poured into a funnel attached above the spray nozzle. The spray lasts 25 to 30 seconds at the end of which time the hoop is taken by one edge and the opposite edge tapped smartly once against a solid object with the wet side facing the solid; this procedure is repeated with the hoop reversed 180°.

Oil Repellency

In the AATCC 118-1966T oil repellency test, drops of standard test liquids, consisting of a selected series of hydrocarbons with varying surface tensions, are placed on the fabric surface and observed for wetting. The Oil Repellency Rating is the highest-numbered test liquid which does not wet the fabric surface. The test is performed by carefully placing a small drop of the lowest-numbered test liquid on the candidate specimen in several locations. The drop is observed for 30 seconds from an angle of about 45°. If no penetration or wetting of the fabric at the liquid-fabric interface and no wicking around the drop occurs, place a drop of the next higher-numbered test liquid at an adjacent site on the fabric and again observe for 30 seconds. The procedure is continued until one of the test liquids shows obvious wetting of the fabric under or around the drop within 30 seconds.

The Standard Test Liquids and their rating are given in the table below:

TABLE I

Standard Test Liquids

AATCC Oil Repellency

TABLE I-continued

Standard Test Liquids

| Rating Number | |
|---|---|
| 1 | "Nujol"[1] |
| 2 | 65:35 "Nujol"; n-hexadecane by volume at 70° F. (21° C.) |
| 3 | n-hexadecane |
| 4 | n-tetradecane |
| 5 | n-dodecane |
| 6 | n-decane |
| 7 | n-octane |
| 8 | n-heptane |

[1]"Nujol" is the trademark of Plough, Inc., for a mineral oil meeting the following specifications: Saybolt viscosity 360/390 at 100° F.(38° C.); specific gravity .880/.900 at 60° F.(15° C.). Nujol is available in most drug stores. All other hydrocarbon liquids should be laboratory quality obtainable through most chemical supply houses. One source is Matheson, Coleman and Bell, East Rutherford, New Jersey. That concern's catalogue designations are as follows:

| Solvent | Catalog Number | Specific Melting Point or Boiling Point Range |
|---|---|---|
| n-hexadecane | HX 205 | 17° to 18° C. |
| n-tetradecane | TX 220 | 4° to 6° C. |
| n-dodecane | DX 2420 | −10.5° to −9.0° C. |
| n-decane | DX 30 | 173° to 175° C. |
| n-octane | OX 60 | 124° to 126° C. |
| n-heptane | HX 80 | 98° to 99° C. |

EXAMPLE 14

An emulsion homopolymer of $R_fCH_2CH_2CH_2OCH_2CH_2OCOC(CH_3)=CH_2$ (Example 6) is prepared by the procedure of Example 10. A portion of the latex (33.7% solids) is diluted with water and padded onto 80 × 80 bleached and mercerized cotton print cloth to give 0.35% polymer solids on the weight of the cloth. The cloth is dried at 180° F. and cured for three minutes at 330° F. AATCC oil repellency rating is 3.

EXAMPLE 15

This example illustrates the procedure for treating fabrics with mixtures of the fluorinated polymers of the invention and nonfluorinated polymers. The mixtures are prepared from emulsion polymers of the fluorinated homopolymer of Example 14 and one of the following nonfluorinated polymers, poly(lauryl methacrylate), poly(tridecyl methacrylate), poly(isodecyl methacrylate) and poly(5-ethyl-2-nonyl methacrylate). The first three emulsion polymers are prepared from the general recipe: 10 g. monomer, 0.5 g. stearyltrimethylammonium bromide, 0.05 g. potassium persulfate, 12.6 g. deionized water and 5.4 g. acetone. Poly(5-ethyl-2-nonyl methacrylate) is prepared by the same recipe except that 13.5 g. deionized water and 4.5 g. acetone are used. Polymerization is carried out as described in Example 10.

With each nonfluorinated polymer two mixtures are prepared, one whose polymer solids contains 45.5% and the other 62.5% nonfluorinated polymer. The eight mixtures are applied to cotton cloth as described in Example 14. The results are given below.

| | Nonfluorinated Polymer | % Solids (owf) | AATCC Oil Repellency | AATCC Spray Rating |
|---|---|---|---|---|
| 45.5% | poly(5-ethyl-2-nonyl methacrylate) | 0.6 | 5 | 90 |
| 62.5% | " | 0.4 | 4 | 90 |
| 45.5% | poly(lauryl methacrylate) | 0.5 | 4 | 80 |
| 62.5% | " | 0.6 | 5 | 90 |
| 45.5% | poly(tridecyl methacrylate) | 0.6 | 5 | 80 |
| 62.5% | " | 0.6 | 4 | 90 |
| 45.5% | poly(isodecyl methacrylate) | 0.6 | 5 | 90 |
| 62.5% | " | 0.4 | 4 | 80 |

EXAMPLE 16

The procedure of Example 15 is repeated using a mixture of 2.1 parts polymer solids of the fluorinated latex from Example 12 and 1.5 parts of polymer solids of a nonfluorinated latex prepared from 100 parts lauryl methacrylate; 5 parts stearyltrimethylammonium bromide; 0.5 parts potassium persulfate; 54 parts acetone and 126 parts deionized water. Polymerization is carried out at 50° C. over a period of 16 hours. The latex is 33.5% solids. The solids content of the combined latices is 34.9%.

The oil and water repellency of treated cotton print cloth are as follows:

| % Polymer Solids, owf[a] | AATCC Oil Repellency | | AATCC Spray Rating | |
|---|---|---|---|---|
| | Initial | One Wash | Initial | One Wash |
| 0.7 | 5 | 2 | 80 | — |

[a]owf = on weight of fabric.

EXAMPLE 17

This example illustrates a mixture of a fluorinated copolymer and a nonfluorinated copolymer.

The procedure of Example 15 is repeated using a mixture of 1 part polymer solids of the latex from Example 13 and 2 parts polymer solids of a nonfluorinated latex prepared from 4.50 g. stearyltrimethylammonium bromide, 8.0 g. acetone, 153.0 g. deionized water, 88.8 g. of isodecyl methacrylate, 1.51 g. N-methylolacrylamide, 450 mg. of ethylene dimethacrylate, and 450 mg. of potassium persulfate. The milky latex weight 208 g., and contains 33.1% solids.

The combined latices are diluted and applied by padding to 50/50 Dacron/cotton cloth (6.5 oz/yd$^2$) and 100% cotton poplin (8 oz/yd$^2$). The results are given below.

| % Polymer Solids, owf[a] | Cloth[b] | AATCC Oil Repellency | | AATCC Spray Rating | |
|---|---|---|---|---|---|
| | | Initial | One Wash | Initial | One Wash |
| 0.5 | 50/50 Dacron/ cotton | 4 | 3 | 70 | 80 |
| 0.5 | 100% cotton poplin | 5 | 4 | 70 | 80 |

[a]owf = on weight of fabric.
[b]The cloth is also treated from the same pad bath with a durable press resin, 9% owf Aerotex LC(American Cyanamid, dimethyloldihydroxyethyleneurea) and 2% owf Water Repellent 95 (American Cyanamid, a 25% emulsion in water of a mixture of paraffin wax and a melamine condensate).

EXAMPLE 18

The procedure of Example 15 is repeated with mixtures of a fluorinated copolymer and a nonfluorinated copolymer in which the fluorinated monomer is $R_f(CH_2)_3O(CH_2)_2OCOC(CH_3)=CH_2$ ($R_f$ = about 5% $C_6F_{13}$, 87% $C_8F_{17}$ and 8% $C_{10}F_{21}$).

The fluorinated polymers are prepared by the general recipe: 10 g. total monomer charge, 0.05 g. potassium persulfate, 0.5 g. stearyltrimethylammonium bromide, 13.5 g. deionized water and 4.5 g. acetone. Polymerization is carried out at 50° for 16 hours as in Example 10. The nonfluorinated polymers are prepared similarly except the ratio of acetone to water varies. The polymers are mixed in the ratio of one part fluorinated polymer solids to two parts nonfluorinated polymer solids. The mixtures are applied to cotton print cloth as described in Example 14. The results are given in the table below.

| Monomer Composition, Parts by Weight | | | |
|---|---|---|---|
| Fluorinated Polymer | Nonfluorinated Polymer | % Solids (owf) | AATCC Oil Repellency |
| 65 R$_f$M/35 EHM/ 0.25 NMA/0.25 HEM | 98.5 EHM/1.0 NMA/0.5 EDM | 0.7 | 3 |
| " | " | 1.5 | 5 |
| 75 R$_f$M/25 EHM/ 0.25 NMA/0.25 HEM | " | 1.5 | 6 |
| 85 R$_f$M/15 LM/ 0.25 NMA/0.25 HEM | 98.5 LM/1.0 NMA/0.5 EDM | 1.5 | 5 |
| 75 R$_f$M/25 LM/ 0.25 NMA/0.25 HEM | 98.5 LM/1.0 NMA/0.5 EDM | 1.5 | 6 |
| 65 R$_f$M/35 IDM/ 0.25 NMA/0.25 HEM | 98.5 IDM/1.0 NMA/0.5 EDM | 1.5 | 6 |
| 70 R$_f$M/30 IDM/ 0.25 NMA/0.25 HEM | " | 0.7 | 4 |

R$_f$M = fluorinated methacrylate
EHM = 2-ethylhexyl methacrylate
NMA = N-methylolacrylamide
HEM = 2-hydroxyethyl methacrylate
EDM = ethylene dimethacrylate
LM = lauryl methacrylate
IDM = isodecyl methacrylateowf = on weight of fabric

EXAMPLE 19

This example illustrates the preparation and application of fluorinated copolymers as stain repellents using $R_fCH_2CH_2CH_2OCH_2CH_2OCOC(CH_3)=CH_2$ ($R_f$ = 5% $C_6F_{13}$, 87% $C_8F_{17}$, 8% $C_{10}F_{21}$).

Fluorinated copolymers are prepared by the procedure of Example 18. The composition of the monomer charge is given below. The polymers are applied as given in Example 14.

| Fluorinated Copolymer Monomer Composition, Parts by Wt. | % Solids (owf) | AATCC Oil Repellency |
|---|---|---|
| 50 R$_f$M/50 IDM | 0.9 | 5 |
| 40 R$_f$M/60 IDM | 0.9 | 5 |
| 45 R$_f$M/55 EHM | 0.9 | 5 |
| 85 R$_f$M/10 IDM/5 CP | 0.4 | 4 |

R$_f$M = fluorinated methacrylate
IDM = isodecyl methacrylate
EHM = 2-ethylhexyl methacrylate
CP = chloroprene
owf = on weight of fabric

What is claimed is:

1. A fluorinated monomer of the formula

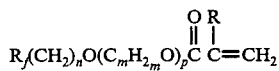

wherein $R_f$ is a perfluoroalkyl group of 4–16 carbon atoms, R is selected from the class consisting of hydrogen and methyl, m is 2–3, n is 1–12 and p is 1–4.

2. A fluorinated monomer according to claim 1 and having the formula

3. A fluorinated monomer according to claim 1 and having the formula

4. A fluorinated monomer according to claim 1 and having the formula

5. A fluorinated monomer according to claim 1 and having the formula

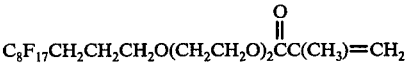

6. A fluorinated monomer according to claim 1 and having the formula

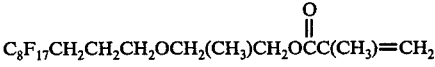

7. A composition selected from the group consisting of fluoroalkyl-alkoxyalkyl acrylate and methacrylate esters corresponding to the formula

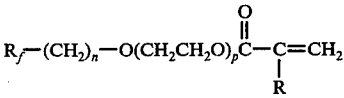

wherein $R_f$ is a straight chain perfluoro alkyl radical containing from 4 to 16 carbon atoms inclusive; $(CH_2)_n$ is a straight chain alkylene radical containing from 1 to 12 carbon atoms; R is selected from the group consisting of hydrogen and methyl radicals; and P is an integer having a value of from 1 to 4 inclusive.

8. A composition comprising a homopolymer of a monomeric composition selected from the group consisting of fluoroalkylalkoxyalkyl acrylate and methacrylate esters correspond to the formula

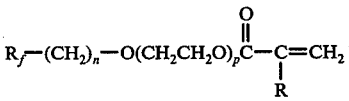

wherein $R_f$ is a straight chain perfluoro alkyl radical containing from 4 to 16 carbon atoms inclusive; $(CH_2)_n$ is a straight chain alkylene radical containing from 1 to 12 carbon atoms; R is selected from the group consisting of hydrogen and methyl radicals; and P is an integer having a value of from 1 to 4 inclusive.

9. A composition selected from the group consisting of fluoroalkyl-alkoxyalkyl acrylate and methacrylate esters corresponding to the formula

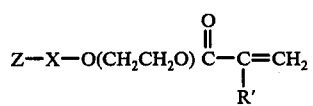
wherein Z is a straight chain perfluoro alkyl radical containing from 4 to 16 carbon atoms inclusive; X is a straight chain alkylene radical containing from 1 to 12 carbon atoms; R' is selected from the group consisting of hydrogen and methyl radicals.
* * * * *

UNITED STATES PATENT AND TRADEMARK OFFICE
CERTIFICATE OF CORRECTION

PATENT NO. : 4,080,507
DATED : March 21, 1978
INVENTOR(S) : John T. Gresham

It is certified that error appears in the above-identified patent and that said Letters Patent are hereby corrected as shown below:

Column 5, line 54, "thermometer, inlet," should read --thermometer, nitrogen inlet,--. Column 9, line 4, "$R_fCH_2CH_2CH_2OCH_2CH_2OCHOCH=CH_2$" should read --$R_fCH_2CH_2CH_2OCH_2CH_2OCOCH=CH_2$--. Column 14, line 31, "$C_8F_{17}CH_2CH_2CH_2OCH_2(CH_3)CH_2O\overset{O}{\overset{\|}{C}}C(CH_3)=CH_2$" should read --$C_8F_{17}CH_2CH_2CH_2OCH(CH_3)CH_2O\overset{O}{\overset{\|}{C}}C(CH_3)=CH_2$--.

Signed and Sealed this

Twenty-fourth Day of July 1979

[SEAL]

Attest:

LUTRELLE F. PARKER

Attesting Officer   Acting Commissioner of Patents and Trademarks